United States Patent [19]

Ueno et al.

[11] Patent Number: 4,607,966
[45] Date of Patent: Aug. 26, 1986

[54] ELECTRONIC TYPEWRITER EQUIPPED WITH TEXT MEMORY WHICH SAVES FORMAT DATA WHILE DELETING A LINE

[75] Inventors: Hideo Ueno; Hiroshi Kuno; Yoshifumi Hamabe, all of Nagoya, Japan

[73] Assignee: Brother Kogyo Kabushiki Kaisha, Aichi, Japan

[21] Appl. No.: 670,031

[22] Filed: Nov. 9, 1984

[30] Foreign Application Priority Data

Nov. 18, 1983 [JP] Japan .................. 58-218407

[51] Int. Cl.⁴ .............................................. B41J 5/30
[52] U.S. Cl. ...................................... 400/63; 400/279; 364/900
[58] Field of Search ........................ 400/61, 63, 70, 76, 400/279, 695, 696, 697; 364/518, 519, 570, 900 MS File, 200 MS File

[56] References Cited

U.S. PATENT DOCUMENTS

| | | | |
|---|---|---|---|
| 3,823,389 | 7/1974 | Heitman et al. | 400/63 |
| 4,016,365 | 4/1977 | Staar | 400/63 |
| 4,028,681 | 6/1977 | Vittorelli | 400/63 |
| 4,480,931 | 11/1984 | Kamikura et al. | 400/63 |

OTHER PUBLICATIONS

"Text Storage Buffer Management", *IBM TDB*; Chen et al., vol. 26, No. 3B, pp. 1416–1418; Aug. 1983.

*Primary Examiner*—Edgar S. Burr
*Assistant Examiner*—David A. Wiecking
*Attorney, Agent, or Firm*—Parkhurst & Oliff

[57] ABSTRACT

An electronic typewriter equipped with a text memory for storing data including character data representing characters to be printed, and format data for arranging the characters to be printed, comprising a line deleting device for deleting data for a line stored in the text memory, a detector for detecting the format data associated with the line to be deleted, and a device for saving the detected format data so that the format data are not deleted from the text memory during a line deleting operation.

6 Claims, 6 Drawing Figures

ELECTRONIC TYPEWRITER EQUIPPED WITH TEXT MEMORY WHICH SAVES FORMAT DATA WHILE DELETING A LINE

BACKGROUND OF THE INVENTION

The present invention generally relates to an electronic typewriter equipped with a text memory, and more particularly to such type of electronic typewriter which prevents deletion of format data included in a line to be deleted when data stored in the text memory are deleted per line, so that an arrangement of characters is not disturbed.

There have been provided electronic typewriters equipped with a text memory which stores data comprising character data which correspond to characters to be printed and format data which are located between the character data and concerned with an arrangement of the characters. In such an electronic typewriter, characters are printed according to the character data stored in the text memory and arranged according to the format data such as carriage return data, which are located between the character data. The format data includes, for example, tab position data which moves a printing position of a character to the next preset print starting position (tab position), left margin position data which specifies the first position of each line, and right margin position data which specifies a right end of each line, so that the first positions of plural character groups of lines are appropriately aligned with the tab position when a table or chart is formed, and the first positions or the last character positions of lines are, respectively, aligned with each other. However, since the format data are located between the character data in the text memory, the format data included in a line to be deleted are deleted together with the character data of the line when the character data of the whole line are deleted, resulting in disarrangement of the characters.

SUMMARY OF THE INVENTION

It is accordingly an object of the present invention to provide an electronic typewriter equipped with a text memory, which saves format data included in a line to be deleted, to prevent the format data from being erased, when the whole line is deleted.

According to the invention, there is provided an electronic typewriter equipped with a text memory, comprising:

(1) line deleting means for deleting data for a line stored in the text memory;

(2) detecting means for detecting the format data in the line to be deleted by the line deleting means; and (3) saving means for saving the detected format data in a predetermined position of the text memory so that the format data detected by the detecting means are not deleted during a line deleting operation.

In the above arrangement, referring to FIG. 1, when characters constituting the line to be deleted by the line deleting means, i.e., character data, are deleted in due order, the format data in the line to be deleted are detected by the detecting means and, the detected format data are saved in a predetermined position of the text memory by the saving means. Consequently, when the character data for the whole line are deleted by the line deleting means, only the format data remain undeleted from the text memory. Therefore, characters that follow are arranged in accordance with the undeleted format data and the disarrangement of characters is eliminated when the line deleting operation is performed.

According to an advantageous embodiment of the invention, the typewriter further comprises displaying means which displays at least a part of one line of plural lines comprising the character data stored in the text memory. The display means displays a desired line of the plural lines by a scrolling operation, and thereby specifies a group of the character data corresponding to the line desired to be deleted by the line deleting means.

According to another advantageous embodiment, the line deleting means is operable in an edit mode. It is appreciated that this edit mode be established by said scrolling operation of the displaying means.

In accordance with one form of the invention, the keyboard of the typewriter includes a delete key and a code key which, when operated simultaneously, enables the line deleting means to be operable to delete the data for a desired line.

According to a preferred embodiment of the invention, the line deleting means is adapted to move a group of data corresponding to the line to be deleted, to a part of the text memory, and the detecting means sequentially detecting said group of data so that the saving means saves the detected format data in a position following a data group constituting a line preceding the line to be deleted. In this instance, the line deleting means sequentially deletes the character data of said group of data which have not been deleted by the detecting means.

BRIEF DESCRIPTION OF THE DRAWINGS

The above and other objects, features and advantages of the present invention will become more apparent from reading the following description of the preferred embodiment taken in connection with the accompanying drawings in which.

DETAILED DESCRIPTION OF THE PREFERRED EMBODIMENT

To further clarify the present invention, a preferred embodiment of an electronic typewriter equipped with a text memory will be described in greater detail, referring to FIGS. 1-4.

Figure 1:
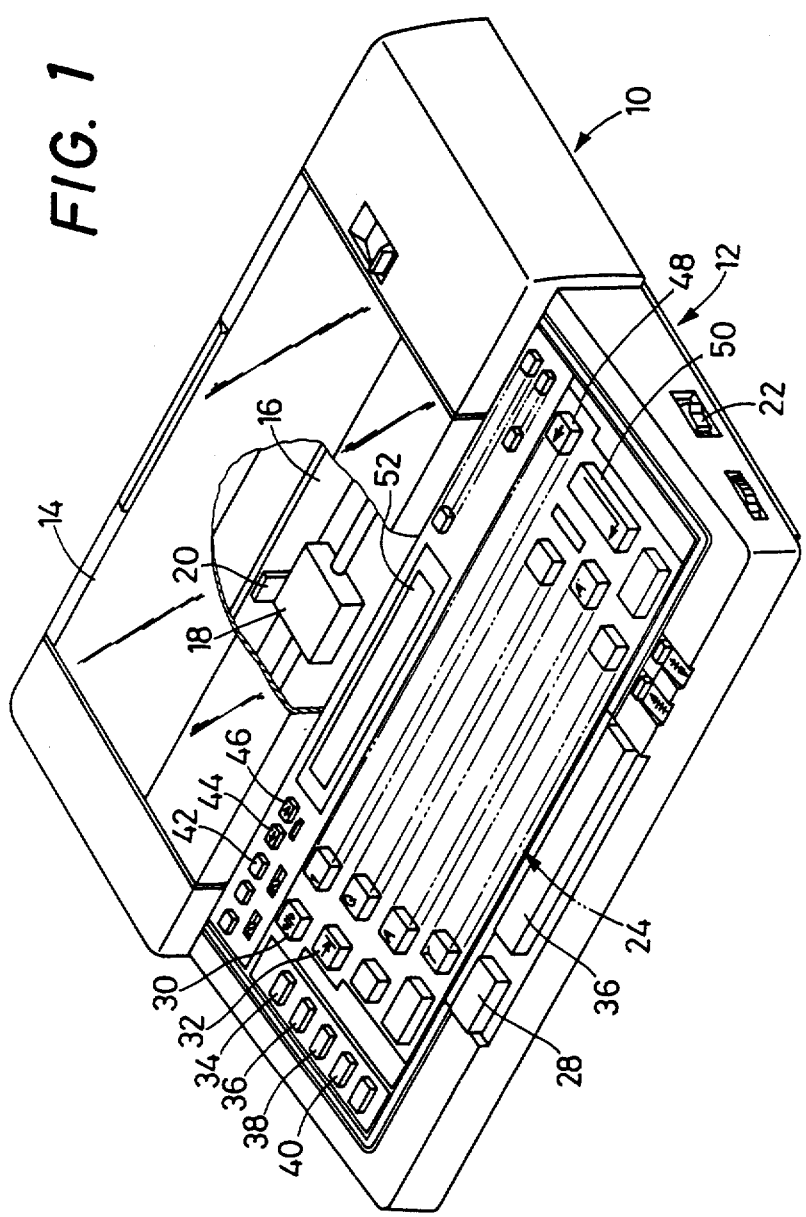
FIG. 1 is a perspective view of one embodiment of the electronic typewriter of the invention.
Figure 2:
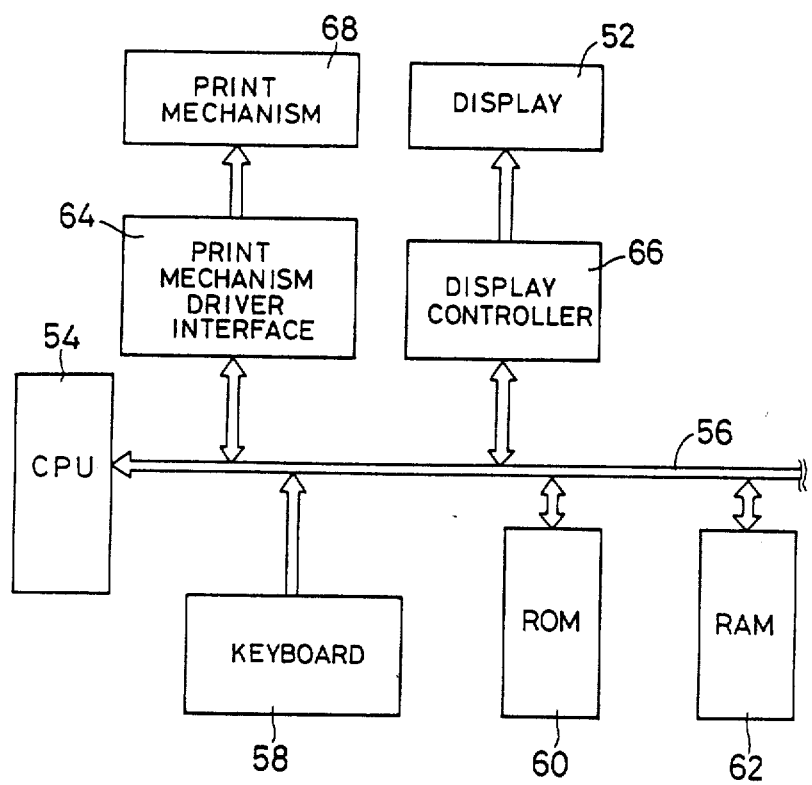
FIG. 2 is a block diagram showing a circuit provided for the embodiment of the electronic typewriter shown in FIG. 1.
Figure 3:
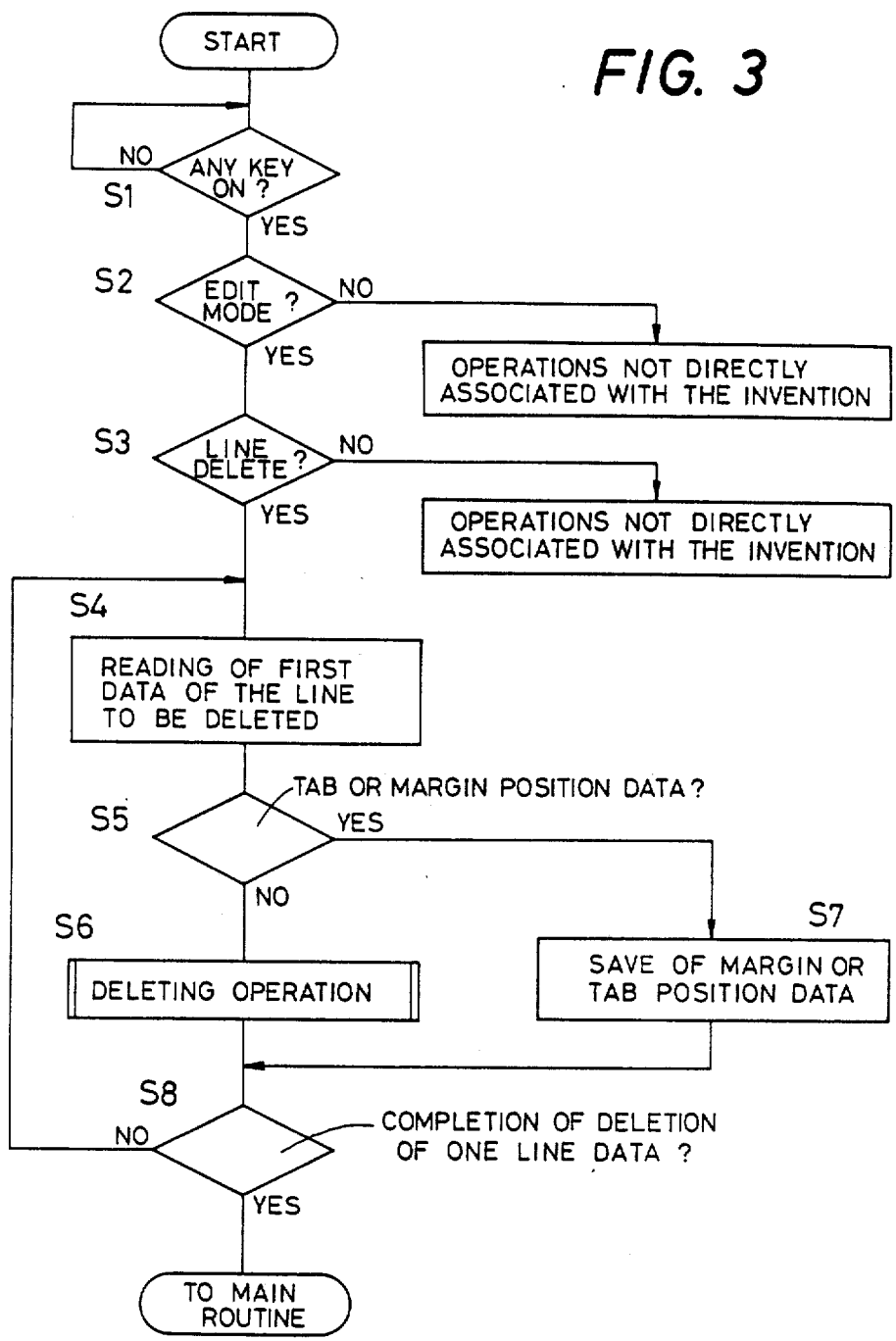
FIG. 3 is a flow diagram showing an operating process of the embodiment shown in FIG. 1.

There is shown in FIG. 1 an electronic typewriter to which the present invention is applied. The electronic typewriter is provided with a printing unit or assembly 10 and a keyboard unit or assembly 12. The printing assembly 10 has a plexiglass cover 14 which is pivotally mounted at a position adjacent to an upward rear edge thereof. The plexiglass cover 14 acts as a paper guide when pivoted to its open position, i.e. when it is inclined slightly rearwardly. In the printing assembly 10, i.e. under the plexiglass cover 14, a platen 16 is supported on a frame in the horizontal direction and a carriage 18 is provided movably in a direction parallel to the platen 16. The carriage 18 has a print head 20 fixed thereto, which moves in relation to a sheet of paper held on the platen 16 so that desired characters, such as letters, symbols, and numerals, and other data are printed on the print paper according to a predetermined arrangement.

The keyboard assembly 12 is provided with a power switch 22 on its side surface and a multiplicity of operation keys on its top surface. These operation keys consist of character keys 24 on each of which an alphabet is imprinted, a space key 26, a code key 28, a margin release key 30, a tab key 32, a left margin key 34, a right margin key 36, a tab set key 38, a tab clear key 40, a delete key 42, a left cursor key 44, a right cursor key 46, a back space key 48, a carriage return key 50 and other keys. In the rear central part of the keyboard assembly 12, there is provided a multi-digit display 52 which displays multiple digits (16 digits or so) of characters and other data so that desired characters stored in a text memory (which will be described later) are displayed.

The electronic typewriter constructed as described above is provided with a circuit shown in FIG. 2. As shown, a CPU 54 is connected, via a data bus 56, with a keyboard 58, a ROM 60, a RAM 62, a print mechanism driver interface 64 and a display controller 66, which are contained in the keyboard assembly 12. The CPU 54 processes signals input from the keyboard 58 according to a program stored in the ROM 60 by use of a temporary memory function of the RAM 62, and causes the print mechanism driver interface 64 to drive a print mechanism 68 incorporated in the printing assembly 10 for printing characters on the print paper in a desired arrangement. The CPU 54 also causes the display controller 66 to drive the multi-digit display 52 for displaying characters corresponding to a desired part of a stored text. The RAM 62 serves as storage means and is provided with a format memory and the text memory. The format memory stores format data which are associated with the arrangement of characters such as margin position data and tab position data. The text memory stores a multiplicity of character data in the order of printing, and appropriately stores the format data which are located between the character data. The character data includes not only alphabets, numerals and symbols but also space data which is used to move a printing position. In other words, the character data are related to the movement of the carriage and used to change the printing position.

The operation of the electronic typewriter constructed as described above will be described, referring to FIG. 3.

Upon depression of the power switch 22 of the electronic typewriter, an initialize routine (not shown) is first executed, and various devices such as a counter and register are cleared. A step S1 is then executed to judge whether or not any of the keys disposed on the keyboard assembly 12 has been pressed. When the key has not been pressed, the step S1 is executed again. When the key has been pressed, a step S2 is executed to judge whether or not an edit mode has been selected. The edit mode is selected when an upward or downward scrolling operation is performed by concurrent depressions of the code key 28 and the left or right cursor key 44 or 46. When the edit mode has not been selected, another operation is executed, for example, a line feeding operation. Since such an operation is not directly related to the present invention, the explanation is omitted. The scrolling operation is utilized to move a displayed line upwardly or downwardly so that a desired line of multiple lines of the character data stored in the text memory are displayed on the multi-digit display 52. When the line deleting operation is performed, the line to be deleted is displayed on the multi-digit display 52.

Figure 4A:
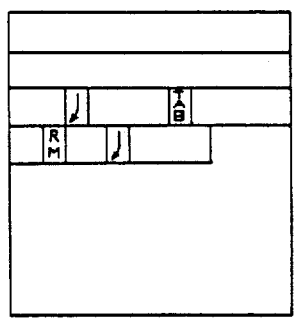
FIGS. 4(a)-(c) are respectively views of a text memory illustrating the changes of memory contents according to the operation of the embodiment shown in FIG. 3.
Figure 4B:
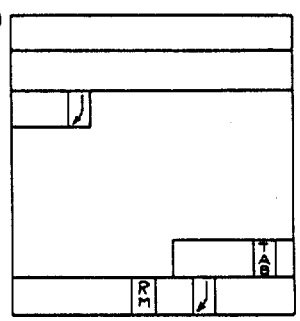
Figure 4C:
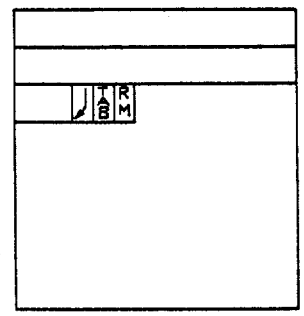

In the step S3, whether or not the line deleting operation has been performed is judged. The line deleting operation is executed when the code key 28 and the delete key 42 are depressed simultaneously. When the line deleting operation has not been performed, a suitable operation not directly associated with the subject of the invention is executed. When the line deleting operation has been performed, a step S4 is executed. In the step S4, the first data of the line to be deleted is read. Then a step S5 is executed, in which the detecting means judges whether or not the data read in the step S4 is tab or margin position data. Namely, in the step S5, the format data is detected. When the read data is not tab or margin position data, the deleting operation is executed in a step S6 so that the read data is deleted. When the read data is tab or margin position data, a step S7 is executed whereby the saving means saves the margin or tab position data to protect it from being deleted from the text memory. Following the step S7, a step S8 is executed to judge whether or not the read data is the last data of the line to be deleted. That is, the step S5 and S7 are repeatedly executed for each data of the line to be deleted until the read data is judged to be the last data of the line. When all the characters of the line have been deleted except the format data, the deletion of the line is judged to have been completed in the step S8, and a main routine is then executed. Consequently, in the preferred embodiment of the invention, the steps S4, S6 and S8 mainly constitute the line deleting means. As a result, the contents of the text memory will be changed as exemplified in FIG. 4(a)–(c). Referring to FIG. 4(a), data for a text are usually located in a batch in the upward position of the text memory. When the line delete mode is selected, a group of data corresponding to the line to be deleted and the next line are moved to the downward position of the text memory as shown in FIG. 4(b). The data which have been moved downwardly are then read and deleted one by one in due order, beginning with the first data. When a tab or margin position data is detected during the reading operation, the detected data is saved in a position at the end of the data group located in the upward position of the text memory as shown in FIG. 4(c), whereby the saved data are not deleted.

Thus, in the above embodiment, if the deletion of one line is executed, the format data such as the margin and tab position data, which are included in the line to be deleted, are not deleted and are saved in the position at the end of a line preceding the line to be deleted. Accordingly, the embodiment of the present invention eliminates a possibility that printing positions of lines located following the deleted line will be disturbed due to the deletion of the format data.

While the present invention has been described in its preferred embodiment, it is to be understood that the invention is not limited thereto, but various changes and modifications can be made to the invention without departing from the spirit and scope of the invention.

What is claimed is:

1. An electronic typewriter comprising:
   text memory means for storing printing data that are executed to print characters, said printing data comprising character data which correspond to said characters to be printed, and format data which are located between the character data to specify an arrangement of the characters to be printed, said character data and said format data being stored together in said text memory means;

line deleting means for deleting only the character data for a line stored in said text memory means;

detecting means for detecting the format data in the printing data for the line to be deleted by said line deleting means; and saving means for saving the detected format data in a predetermined position of said text memory means when the character data is deleted by said line deleting means.

2. An electronic typewriter as recited in claim 1, further comprising displaying means which displays at least a part of one line of plural lines comprising the character data stored in said text memory means, said displaying means displaying a desired line of said plural lines by a scrolling operation, and thereby specifying a group of the character data corresponding to the line desired to be deleted by said line deleting means.

3. An electronic typewriter as recited in claim 1, wherein said line deleting means is operable in an edit mode.

4. An electronic typewriter as recited in claim 2, wherein said line deleting means is operable in an edit mode, and said edit mode is established by said scrolling operation.

5. An electronic typewriter as recited in claim 1, further comprising a delete key and a code key, said line deleting means deleting the data for a line when said delete key and code key are operated simultaneously.

6. An electronic typewriter as recited in claim 1, wherein said line deleting means moves a group of printing data, corresponding to the line to be deleted, to a part of said text memory means, said detecting means sequentially checking said group of printing data to detect the format data, said saving means permitting the detected format data to be retained in a position of said text memory means following a data group which constitutes a line preceding the line to be deleted, said line deleting means sequentially deleting the character data of said group of printing data.

* * * * *